United States Patent
Fattal et al.

(10) Patent No.: US 9,008,453 B2
(45) Date of Patent: Apr. 14, 2015

(54) BLUR-KERNEL ESTIMATION FROM SPECTRAL IRREGULARITIES

(71) Applicant: Yissum Research Development Company of The Hebrew University of Jerusalem Ltd., Jerusalem (IL)

(72) Inventors: Raanan Fattal, Jerusalem (IL); Amit Goldstein, Tel Aviv (IL)

(73) Assignee: Yissum Research Development Company of The Hebrew University of Jerusalem Ltd., Jerusalem (IL)

(*) Notice: Subject to any disclaimer, the term of this patent is extended or adjusted under 35 U.S.C. 154(b) by 114 days.

(21) Appl. No.: 13/926,756

(22) Filed: Jun. 25, 2013

(65) Prior Publication Data

US 2013/0343669 A1    Dec. 26, 2013

Related U.S. Application Data

(60) Provisional application No. 61/663,747, filed on Jun. 25, 2012.

(51) Int. Cl.
| | | |
|---|---|---|
| *G06K 9/40* | (2006.01) | |
| *G06T 5/00* | (2006.01) | |
| *G06T 5/20* | (2006.01) | |

(52) U.S. Cl.
CPC .. *G06T 5/003* (2013.01); *G06T 5/20* (2013.01)

(58) Field of Classification Search
None
See application file for complete search history.

(56) References Cited

U.S. PATENT DOCUMENTS

| 2013/0071028 A1* | 3/2013 | Schiller et al. | 382/180 |
| 2013/0271616 A1* | 10/2013 | Hirakawa et al. | 348/208.6 |
| 2014/0126833 A1* | 5/2014 | Huang et al. | 382/254 |

OTHER PUBLICATIONS

Yizhaky et al. "Direct Method for Restoration of Motion-Blurred Images" Journal of the Optical Society of America vol. 15 Jun. 1998 p. 1512-1519.*

Hu et al. "PSF Estimation via Gradient Domain Correlation" IEEE Transations on Image Processing vol. 21. No. 1 Jan. 2012 p. 386-392.*

* cited by examiner

*Primary Examiner* — Sean Motsinger
(74) *Attorney, Agent, or Firm* — Pearl Cohen Zedek; Latzer Baratz LLP (57) ABSTRACT

A method for deriving a blur kernel from a blurred image is provided herein. The method may include the following steps: obtaining a blurred image B, being a product of a blur kernel k applied to an original image I; calculating $f_\theta(x) = R_{d * P_\theta(B)}(x)$ for every angle $\theta$, wherein R denotes an autocorrelation operator, $P_\theta$ denotes a projection operator of based on angle $\theta$, and d denotes a one dimensional differentiation filter; estimating spectral power of the blur kernel based on a given support parameter; estimating the blur kernel k using a phase retrieval algorithm, based on the estimated spectral power of the blur kernel; updating the support parameters; and repeating the estimating of the spectral power, the estimating of the kernel and the updating of the support parameters in an iterative, to yield the blur kernel.

20 Claims, 4 Drawing Sheets

210 — OBTAINING A BLURRED IMAGE B, BEING A PRODUCT OF A BLUR KERNEL K APPLIED TO AN ORIGINAL IMAGE I, WHEREIN B AND I ARE MATRICES REPRESENTING PIXEL IMAGE ARRAYS AND K IS A KERNEL OF A MATRIX

220 — CALCULATING $f_\Theta(x) = R_d * p_{\Theta(B)}(x)$ FOR EVERY ANGLE $\Theta$, WHEREIN R DENOTES AN AUTOCORRELATION OPERATOR, $P_\Theta$ DENOTES A PROJECTION OPERATOR OF A TWO DIMENSIONAL SIGNAL INTO ONE DIMENSION BASED ON ANGLE $\Theta$ AND D DENOTES A ONE DIMENSIONAL DIFFERENTIATION FILTER APPLIED TO A PRODUCT OF THE PROJECTION OPERATOR $P_\Theta$ AND THE BLURRED IMAGE B

230 — SETTING SUPPORT PARAMETERS $S_\Theta$ TO $\mathrm{ARGMIN}_x f_\Theta(x)$

240 — ESTIMATING $|\hat{k}|^2$ DENOTING A SPECTRAL POWER OF THE BLUR KERNEL BASED ON A GIVEN SUPPORT PARAMETER

250 — ESTIMATING THE BLUR KERNEL K USING A PHASE RETRIEVAL ALGORITHM, BASED ON THE ESTIMATED SPECTRAL POWER OF THE BLUR KERNEL $|\hat{k}|^2$

260 — UPDATING THE SUPPORT PARAMETERS $S_\Theta$ TO $\mathrm{ARGMAX}_x (R_{p\Theta(k)}(X) > a\ \mathrm{MAX}(R_{p\Theta(k)}))$, WHEREIN A IS CONSTANT NUMBER

270 — REPEATING THE ESTIMATING OF THE SPECTRAL POWER $|\hat{k}|^2$, THE ESTIMATING OF THE KERNEL AND THE UPDATING OF THE SUPPORT PARAMETERS $S_\Theta$ IN AN EXPECTATION MAXIMIZATION (EM) PROCEDURE, TO YIELD THE BLUR KERNEL k

BLUR-KERNEL ESTIMATION FROM SPECTRAL IRREGULARITIES

CROSS-REFERENCE TO RELATED APPLICATIONS

This application is a Non Provisional application claiming the benefit of U.S. Provisional Patent Application No. 61/663,747, filed on Jun. 25, 2012, which is incorporated herein in its entirety.

FIELD OF THE INVENTION

The present invention relates generally to the field of image enhancement, and in particular, to reducing blur based on spectral irregularities estimation.

BACKGROUND OF THE INVENTION

In many practical scenarios, such as hand-held cameras or ones mounted on a moving vehicle, it is difficult to eliminate camera shake. Sensor movement during exposure leads to unwanted blur in the acquired image. Under the assumption of white noise and spatially-invariant blur across the sensor this process may be modeled by Eq. (1) below:

$$B(x)=(I*k)(x)+\eta(x) \qquad (1)$$

where * denotes the convolution operation, B is the acquired blurry image, k is the unknown blur kernel and $\eta(x)$ is a zero-mean, identically- and independently-distributed noise term at every pixel $x=(x,y)$. Blind image deconvolution, the task of removing the blur when the camera motion is unknown, is a mathematically ill-posed problem since the observed image B does not provide enough constraints for determining both I and k. Most deblurring techniques, therefore, introduce additional constraints over I and k. The most common framework for incorporating such prior knowledge is through maximum a posteriori (MAP) estimation. Norms favoring sparse derivatives are often used to describe I as a natural image. While not being failure-free, this approach was shown to recover very complex blur kernels and achieve impressive deblurred results. However, the maximization of these estimators is a time consuming task involving the computation of the latent image multiple times.

An alternative approach to the problem, which did not receive as much attention, extracts the blur kernel k directly from the blurry image B without computing I in the process. The basic idea is to recover k from the anomalies that B shows with respect to the canonical behavior of natural images. One solution known in the art is to compute the 1D autocorrelation of the derivative of B along the sensor movement direction. Normally, image derivatives are weakly correlated and hence this function should be close to a delta function. The deviation from this function provides an estimate for the power spectrum (PS) of the kernel, $|\hat{k}(\omega)|^2$.

One known approach is to recover the PS of two-dimensional kernels and use the eight-point Laplacian for whitening the image spectrum. The blur kernel is then computed using a phase retrieval technique that estimates the phase by imposing spatial non-negativity and compactness. This approach consists of evaluating basic statistics from the input B and, unlike methods that use MAP estimation, does not involve repeated reconstructions of I. While this makes it favorable in terms of computational-cost, the true potential of this approach in terms of accuracy was not fully explored.

Current solutions were directed at the removal of image blur due to camera motion. Blind-deconvolution methods that recover the blur kernel k and the sharp image I rely on various regularities natural images exhibit. The most-dominant approach for tackling this problem, in the context of spatially-uniform blur kernel, is to formulate and solve a MAP problem. This requires the minimization of a log-likelihood term that accounts for Eq. (1) plus additional prior terms that score the resulting image I and kernel k. One solution uses an autoregressive Gaussian prior for I(x) and another solution uses a similar Gaussian prior over high-frequencies (derivatives) of I. Both priors are blind to the phase content of k and are not sufficient for recovering it. Another approach further assumes that the blur is symmetric (zero phase) while another approach incorporates adaptive spatial weighting which breaks this symmetry. Yet in another known approach, the Gaussian image prior is replaced with a Laplace distribution defined by the l1 norm over the image derivatives. This choice is more consistent with the heavy-tailed derivative distribution observed in natural images. Yet another suggestion of the current art shows that this prior is not sufficient for uniqueness and may result in degenerate delta kernels. Indeed, methods that rely on sparse norms often introduce additional constraints such as smoothness of the blur-kernel and two motion-blurred images or use alternative image priors such as spatially-varying priors and ones that marginalize over all possible sharp images I(x).

SUMMARY OF THE INVENTION

The present invention, in embodiments thereof, provides a method for recovering the blur from irregularities in the statistics of motion-blurred images. The power-law model is derived and used to describe the PS of natural images, which refines the traditional $\|\omega\|^{-2}$ law. This new model better accounts for biases arising from the presence of large and strong edges in natural images. This model is used, as well as a more accurate spectral whitening formula, to recover the PS of the blur kernel, $|\hat{k}(\omega)|^2$, in a more robust and accurate manner compared to previous methods following this approach. We also describe several modifications to standard phase retrieval algorithms, allowing them to better converge and resolve ambiguities.

Unlike methods that rely on the presence and the identification of well-separated edges in the image, the purely statistical approach is accordance with embodiments of the present invention copes well with images containing under-resolved texture and foliage clutter, which are abundant in outdoor scenes. Similarly to known solutions the latent image is not reconstructed repeatedly the input image is being accessed only once to extract a small set of statistics. Thus, the core of the technique in accordance with embodiments of the present invention depends only on the blur kernel size and does not scale with the image dimensions.

Advantageously, the method in accordance with some embodiments of the present invention is capable of achieving highly-accurate results, in various scenarios that challenge other approaches, and compares well with the state-of-the-art. The CPU implementation of embodiments of the present invention achieves these results at running-times considerably faster than MAP-based methods.

These additional, and/or other aspects and/or advantages of the present invention are set forth in the detailed description which follows.

BRIEF DESCRIPTION OF THE DRAWINGS

For a better understanding of the invention and in order to show how it may be implemented, references are made, purely by way of example, to the accompanying drawings in which like numerals designate corresponding elements or sections. In the accompanying drawings.

The drawings together with the following detailed description make the embodiments of the invention apparent to those skilled in the art.

DETAILED DESCRIPTION OF THE INVENTION

With specific reference now to the drawings in detail, it is stressed that the particulars shown are for the purpose of example and solely for discussing the preferred embodiments of the present invention, and are presented in the cause of providing what is believed to be the most useful and readily understood description of the principles and conceptual aspects of the invention. In this regard, no attempt is made to show structural details of the invention in more detail than is necessary for a fundamental understanding of the invention. The description taken with the drawings makes apparent to those skilled in the art how the several forms of the invention may be embodied in practice.

Before explaining the embodiments of the invention in detail, it is to be understood that the invention is not limited in its application to the details of construction and the arrangement of the components set forth in the following descriptions or illustrated in the drawings. The invention is applicable to other embodiments and may be practiced or carried out in various ways. Also, it is to be understood that the phraseology and terminology employed herein is for the purpose of description and should not be regarded as limiting.

Figure 1:
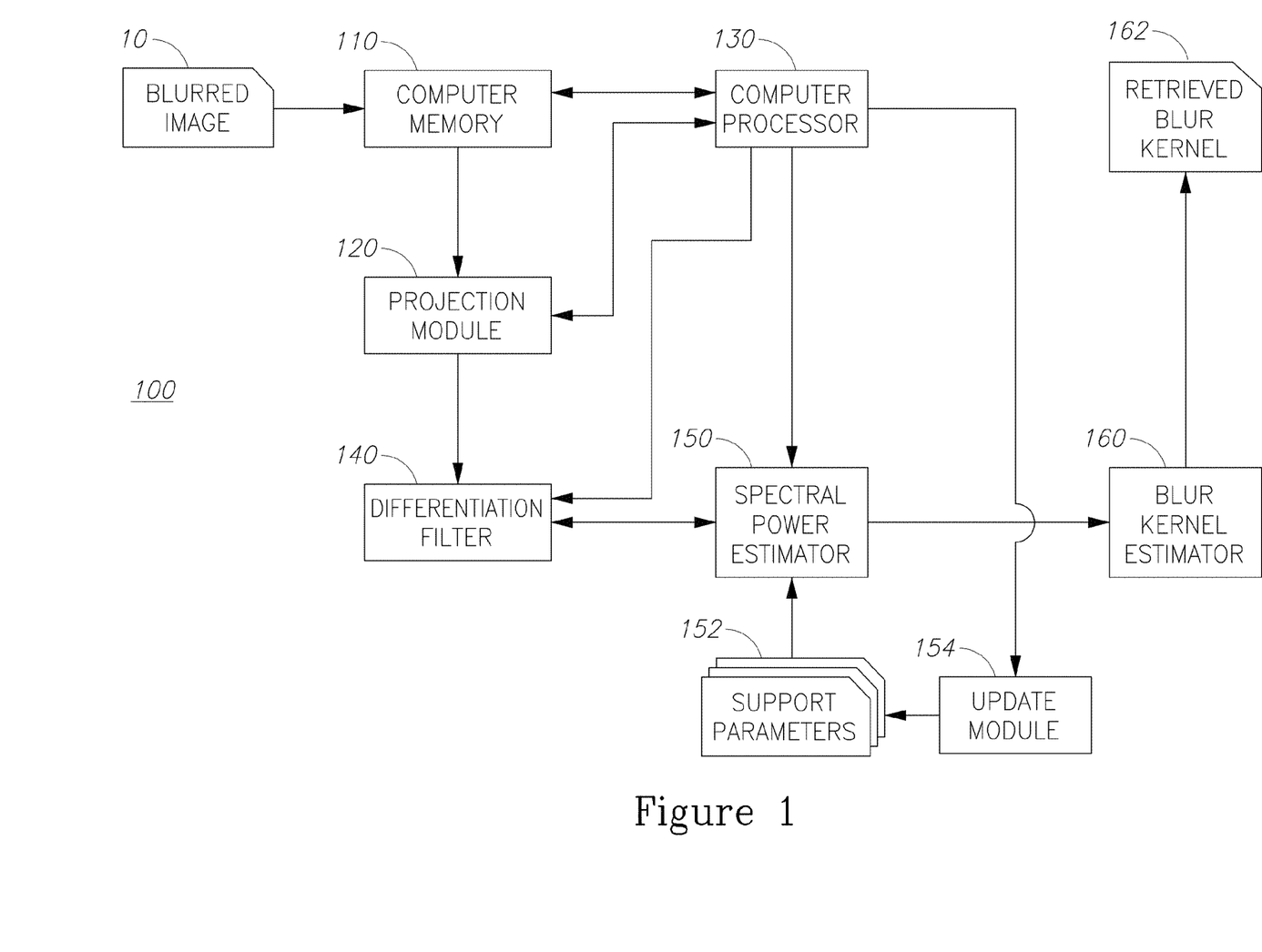
FIG. 1 is a high level block diagram illustrating a system according to some embodiments of the present invention.

FIG. 1 is a high level block diagram illustrating a system 100 according to some embodiments of the present invention. System 100 may include a computer memory 110 configured to obtain a blurred image B 10, being a product of a blur kernel k applied to an original image I, wherein B and I are matrices representing pixel image arrays and k is a kernel of a matrix. System 100 may further include a computer processor 130 configured to: calculate $f_\theta(x) = R_{d*P\theta(B)}(x)$ for every angle $\theta$, wherein R denotes an autocorrelation operator, $P_\theta$ denotes a projection module 120 configured to project a two dimensional signal into one dimension based on angle $\theta$, and d denotes a one dimensional differentiation filter 140 applied to a product of the projection operator $P_\theta$ and the blurred image B. System 100 may further include support parameters $s_\theta$ 152 set initially to $\text{argmin}_x f_\theta(x)$, and a spectral estimator 150 configured to estimate $|\hat{k}|^2$ denoting a spectral power of the blur kernel based on a given support parameter. System 100 may further include a blur kernel estimator 160 configured to estimate the blur kernel k 162 using a phase retrieval algorithm, based on the estimated spectral power of the blur kernel $|\hat{k}|^2$. System 100 may further include an update module 154 configured to update the support parameters $s_\theta$ to $\text{argmax}_x (R_{P\theta(k)}(x) > a \cdot \max_x (R_{P\theta(k)}))$, wherein a is a constant number. Computer processor 130 is further configured to repeat the estimating of the spectral power $|\hat{k}|^2$, the estimating of the kernel and the updating of the support parameters $s_\theta$ in an expectation maximization (EM) procedure, to yield the blur kernel k.

Figure 2:
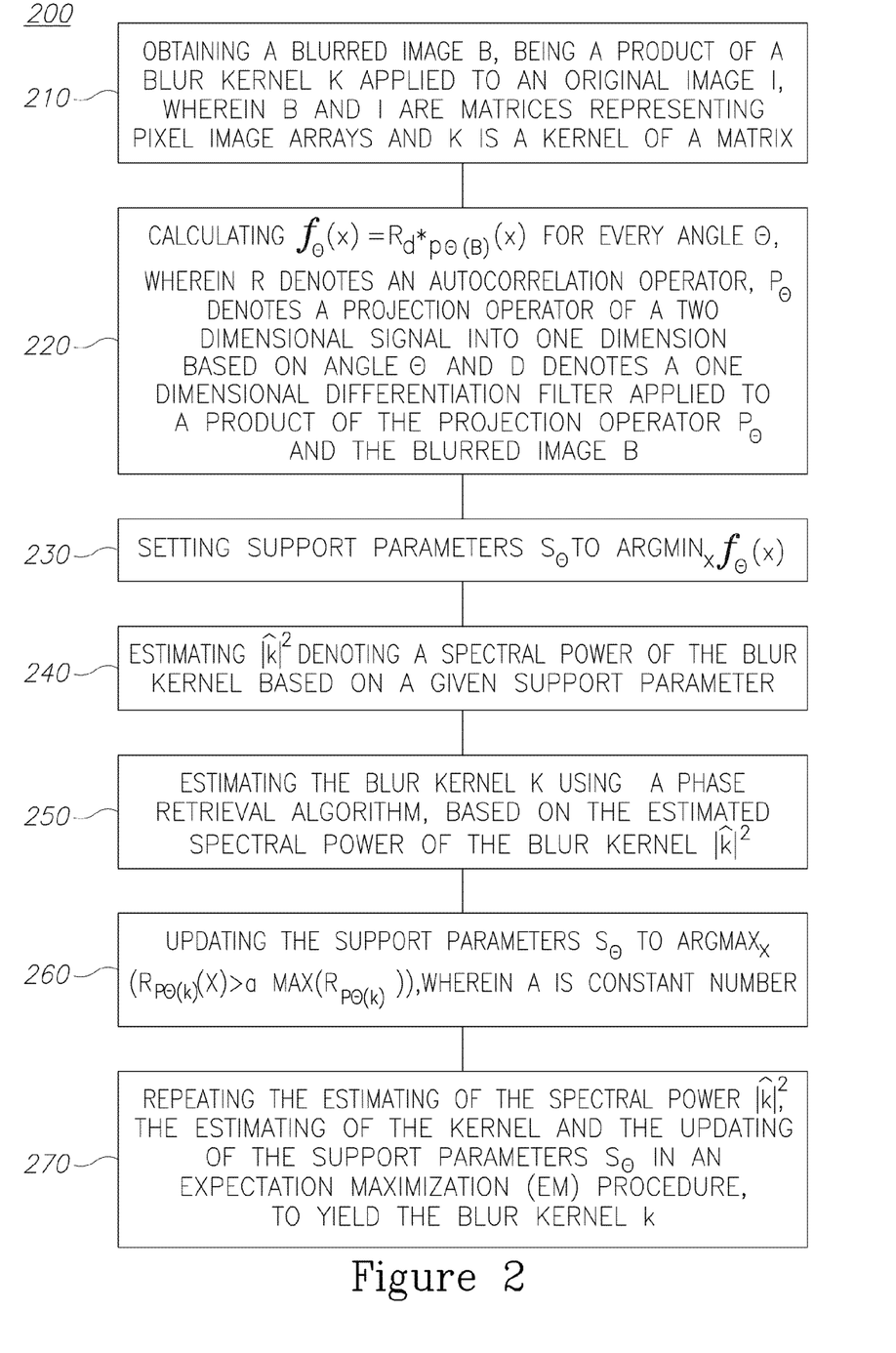
FIG. 2 is a high level flowchart diagram illustrating a method according to embodiments of the present invention.

FIG. 2 is a high level flowchart diagram illustrating a method 200 according to embodiments of the present invention. It is understood that method 200 is not necessarily limited to the aforementioned architecture of computer network 100 but may be carried out by similar networks. Method 200 includes the following stages: obtaining a blurred image B, being a product of a blur kernel k applied to an original image I, wherein B and I are matrices representing pixel image arrays and k is a kernel of a matrix 210; calculating $f_\theta(x) = R_{d*P\theta(B)}(x)$ for every angle $\theta$, wherein R denotes an autocorrelation operator, $P_\theta$ denotes a projection operator of a two dimensional signal into one dimension based on angle $\theta$, and d denotes a one dimensional differentiation filter applied to a product of the projection operator $P_\theta$ and the blurred image B 220; setting support parameters $s_\theta$ to $\text{argmin}_x f_\theta(x)$ 230; estimating $|\hat{k}|^2$ denoting a spectral power of the blur kernel based on a given support parameter 240; estimating the blur kernel k using a phase retrieval algorithm, based on the estimated spectral power of the blur kernel $|\hat{k}|^2$ 250; updating the support parameters $s_\theta$ to $\text{argmax}_x (R_{P\theta(k)}(x) > a \cdot \max_x (R_{P\theta(k)}))$, wherein a is constant number 260; and repeating the estimating of the spectral power $|\hat{k}|^2$, the estimating of the kernel and the updating of the support parameters $s_\theta$ in an expectation maximization (EM) procedure, to yield the blur kernel k 270.

Going now into more details of the embodiments of the present invention, it has been already pointed out that the following power-law describes the power spectra of images of natural scenes as in Eq. (2) below:

$$|\hat{I}(\omega)|^2 \propto \|\omega\|^{-\beta} \quad (2)$$

Where I is a natural image, $\hat{I}$ its Fourier transform and $\omega$ denotes the frequency coordinates. Compact second-order derivative filters, for example $l_x = [-1, 2, -1]$, provide a good approximation for $|\omega_x|^2$ especially at low frequencies since as shown in Eq. (3) below:

$$\hat{l}_x(\omega_x) = 2(\cos(\omega_x \pi) - 1) \approx \pi^2 \omega_x^2 + O(\omega_x^4) \quad (3)$$

where the last equality is based on Taylor approximation of cosine around $\omega_x = 0$. d is denoted the as 'square-root' filter of l which is defined as the symmetric filter giving $l = \bar{d} * d$ where the bar sign denotes mirroring. This factorization exists for every symmetric filter with non-negative frequency response, i.e., $\hat{I}(\omega) \geq 0$ Filtering an image obeying Eq. (2) with d results in a signal with whitened spectrum, since as in Eq. (4) below:

$$|\widehat{I*d}(\omega)|^2 = |\hat{I}(\omega)|^2 \cdot |\hat{d}(\omega)|^2 = |\hat{I}|^2 \cdot \hat{l}(\omega) \approx \pi^2 \|\omega\|^{-2} \|\omega\|^2 = \text{const.} \quad (4)$$

where the equality $|\hat{d}(\omega)| = \hat{I}(\omega)|$ is the Fourier analog of $l = \bar{d} * d$. Thus, in the case of a blurry image $B = I * k$, this procedure can be used to obtain the following estimate of the blur-kernel PS, as in Eq. 5 below:

$$|\widehat{B*d}(\omega)|^2 = |\hat{I}(\omega)|^2 \cdot \hat{l}(\omega) \cdot |\hat{k}(\omega)|^2 \approx c|\hat{k}(\omega)|^2 \quad (5)$$

The Wiener-Khinchin theorem relates the PS of any signal J to its autocorrelation by Eq. (6) below:

$$\hat{R}_J(\omega) = |\hat{J}(\omega)|^2 \quad (6)$$

This identity introduces real-space counterparts for the spectrum whitening in Eq. (4) and the blur approximation in Eq. (5), that are given by Eq. (7) below:

$$R_{I*d}(x) \approx c\delta(x), \text{ and } R_{B*d}(x) \approx cR_k(x) \qquad (7)$$

where $\delta$ is the Dirac's delta-function, i.e., $\delta(0, 0)=1$ and zero otherwise.

Some teachings of the prior art exploit this regularity in natural images and recover the power spectra of one-dimensional blur kernels by differentiating the image along the blur direction (which they also estimate). In order to obtain the complete kernel k, they estimate its phase using the Hilbert transform under the assumption of minimal-phase blur. Some teachings known in the art use this regularity to recover general two-dimensional kernels by whitening the image spectrum using the eight-point Laplacian filter. Given the estimated spectral power of the kernel, they compute the kernel by recovering its phase using the error-reduction phase-retrieval algorithm.

While Eq. (2) models well certain images, the presence of long edges, both in natural and man-made scenes, undermines its accuracy. Sometimes, the power spectra show increased magnitudes along radial streaks which are orthogonal to the strong image edges. These streaks break the rotational symmetry predicted by Eq. (2). Analogously, the auto-correlation functions of images, after being whitened with d, or 1, differ considerably from the delta function, predicted in Eq. (7), along the directions of the strong edges. Clearly, such deviations from the power-law in Eq. (2) undermine the accuracy of the recovered spectral power of the kernel from Eq. (5), or equivalently $R_k$ recovered from Eq. (7).

The question is, therefore, how does this discrepancy behave. To answer this, cross-sections of the PS may be plotted along the most extreme orientations. The log-log plots of these 1D functions, can be approximately described by an additive offset which means that the PS of a natural image vary by multiplicative factors along different directions, as in Eq. (8) below:

$$|\hat{I}(\omega)|^2 \approx c_{\theta(\omega)} \cdot \|\omega\|^{-2} \qquad (8)$$

Figure 3:
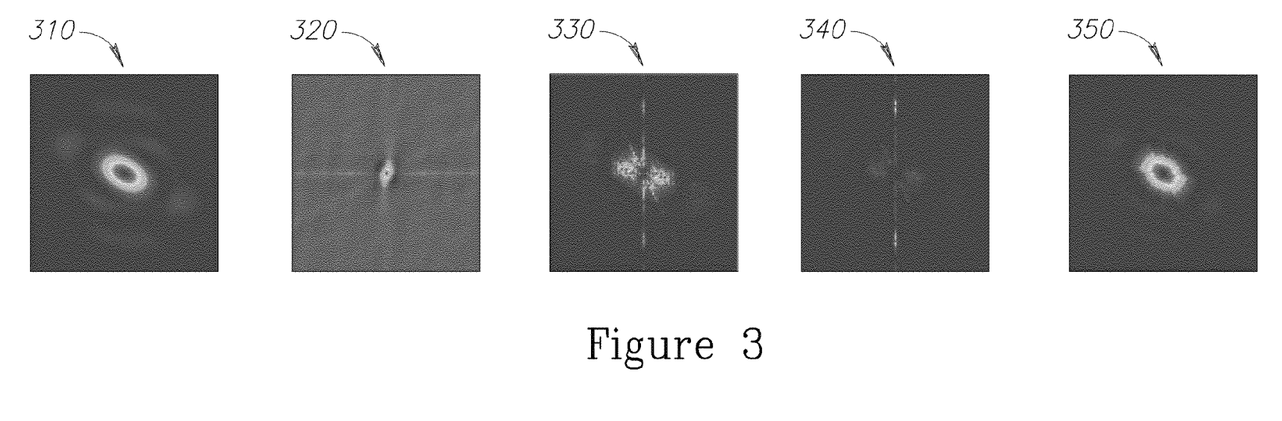
FIG. 3 shows diagrams illustrating an aspect according to embodiments of the present invention.

FIG. 3 illustrates a comparison between different spectral whitening procedures on an image containing strong horizontal edges. In FIG. 3 the kernel PS is shown first as the try kernel PS 310 and then it is estimated by whitening the image with d 320 and 330 and l 340 and using the method which relies on the refined power-law in Eq. (8) 350.

Following is the Fourier slice theorem which will become instrumental for implementing the method according to some embodiments of the present invention and is given by Eq. (9) below:

$$(\widehat{P_\theta(J)})(\omega) = \hat{J}(\omega r_\theta) \qquad (9)$$

where $P_\theta(J)$ is a projection of a 2D signal into 1D by integrating it along the direction orthogonal to $\theta$ and $r_\theta$ is a unit vector in 2D with the orientation of $\theta$.

Thus, $\omega r_\theta$ parameterizes with orientation of $\theta$ using the scalar $\omega$. When applying this theorem in out context, where $J=|\hat{I}|^2$, Eq. is obtained as depicted below:

$$\widehat{R_{P_\theta(I)}}(\omega) = |\widehat{P_\theta(I)}(\omega)|^2 = |\hat{I}(\omega r_\theta)|^2 \approx c_\theta \cdot |\omega|^{-2} \qquad (10)$$

where the first equality follows from the Wiener-Khinchin theorem which applies between the 1D autocorrelation of the projected image $P_\theta(I)$ and its power spectrum in 1D Fourier space. The last equality follows from Eq. (8) where the restriction to a single slice leaves only a single unknown $c_\theta$.

Given a blurry image $B=I*k$, the relation in Eq. (10) allows us to recover the spectral power of the kernel up to a single scalar $c_\theta$ as in Eq. (11) below:

$$(\widehat{R_{d*P_\theta(B)}})(\omega) = \hat{I}(\omega) \cdot |\hat{B}(\omega r_\theta)|^2 = \hat{I}(\omega) \cdot |\hat{I}(\omega r_\theta)|^2 \cdot |\hat{k}(\omega r_\theta)|^2 \approx c_\theta \cdot |\hat{k}(\omega r_\theta)|^2 \qquad (11)$$

resulting 1D Laplacian $l=\bar{d}*d$. This can be written in real-space, once again using the Wiener-Khinchin theorem, in Eq. (12) below:

$$(R_{d*P_\theta(B)})(x) \approx c_\theta \cdot R_{P_\theta(k)}(x) \qquad (12)$$

Thus, as depicted in Algorithm 1 table below the first step of the algorithm in accordance with embodiments of the present invention is to compute $f_\theta(x)$ for every angle $\theta$. Since it is required to recover the spectral power of the kernel on a grid of pixels, the picked angles are those that result in slices passing exactly through each pixel. We implemented the projection operator $P_\theta$ using a nearest-neighbor sampling which achieved higher accuracy and runs in less time compared to other interpolation formulae we tested.

The resulting projected values correspond to averaging of a large number of pixels, proportional to the image dimensions n. The averaging of the independent noise terms in Eq. (1) results in a noise reduction by a factor that renders the noise present as negligible.

Estimating spectral power of the kernel slice-by-slice according to Eq. (12) introduces a set of unknowns $c_\theta$, some of which are mutual to more than one value in estimated kernel power. Additionally, the mean of the projected slices $P_\theta(B)$ is lost due to the differentiation with d in Eq. (11)), or equivalently $\hat{k}(0r_\theta)$. The missing mean values are denoted by $m_\theta$. $c_\theta$ and $m_\theta$ may be recovered based on the following three kernel modeling assumptions:

1. Camera blur kernels are proportional to time period in which light is integrated at each camera offset as it move during exposure. Thus, these numbers are all non-negative, i.e., $k\_0$, and so is its projection $P_\theta(k)$ and the 1D autocorrelation function $RP_\theta(k)$;

2. Assuming a finite camera motion, the blur kernel support must be bounded; Similarly to the positivity case, the finite support is also inherited by $P\_(k)$ and $RP\_(k)$. Thus, for each\_we have s\_such that for every $|x|\_s$\_there is $RP\_(k)(x)=0$; and 3. Assuming that camera blur does not affect the total amount of light reaching the sensor is expressed by R k(x) dx=1.

By repeating this procedure for all the $\theta$ an approximation for the full 2D blur-kernel PS function is obtained. This approximation is used to recover the blur kernel k using a phase-retrieval algorithm that will be described hereinafter.

Embodiments of the present invention provide an algorithm consisting of an iterative EM-like procedure where there is a switch between estimating the kernel k(x) given the support variables $s\theta$ and estimating $s\theta$ from the recovered k(x). There is a procedure with the initial guess $s\theta$=argmin x f\_(x).

Then, given the retrieved kernel the values are updated as seen in the table below of Algorithm 1

---
Algorithm (1)
---
Algorithm 1: Iterative kernel recovery.

Input: blurry image B;
 calculate $f_\theta = R_{d*P_\theta(B)}$;
 set $s_\theta = \text{argmin}_x f_\theta(x)$;
 for i = 1..$N_{outer}$ do
 | estimate $|\hat{k}|^2$ given $s_\theta$;
 | estimate kernel using phase retrieval Alg. 2 given $|\hat{k}|^2$;
 | update $s_\theta = \text{argmax}_x (R_{P_\theta(k)}(x) > 0.1 \cdot \max(R_{P_\theta(k)}))$;
 end
Output: recovered blur kernel k:

Recovering the kernel k, given its power spectrum requires estimating the phase component of $\hat{k}(\omega)$. There are quite a few algorithms that retrieve a signal or its phase given its power spectrum and additional constraints, such the signal being positive and of limited spatial support. Largely speaking, these algorithms iteratively switch between Fourier and real-space domains to enforce the input PS and spatial constraints respectively.

While this algorithm performs well on an accurate input, it further alternates between the error-reduction and another method called hybrid input-output that avoids this problem.

Following is an exemplary algorithm that may be implemented in order to carry out the required phase retrieval:

---

Algorithm (2)
Algorithm 2: Phase retrieval algorithm.

---

Input: kernel magnitude spectrum, $p(\omega)$, kernel size s;

for n = 1 . . $N_{guesses}$ do

// initiate the phase $\phi(\omega)$ randomly;

sample $\phi(\omega)$ uniformly from $[-\pi, \pi]$;

// switch to real-space using inv. Fourier trans.;

$g = \mathcal{F}^{-1}(p \cdot e^{i\phi})$;

for m = 1 . . $N_{inner}$ do

// apply Fourier domain constraints;

$g_2 = \mathcal{F}^{-1}\big((\alpha p + (1-\alpha)|\hat{g}|) \cdot e^{i \cdot Phase(\hat{g})}\big)$;

// apply space domain constraints;

$\Omega = \{x : g_2(x) < 0\} \cup \{x : x \in [0,s] \times [0,s]\}$;

define $\Delta(x) = \begin{cases} g(x) & \text{if } x \in \Omega \\ 0 & \text{if } x \notin \Omega \end{cases}$;

$g(x) = g_2(x)$ for $x \notin \Omega$;

if hybrid input-output step (250 iterations) then $g(x) = g(x) - \beta\Delta(x)$, for $x \in \Omega$;

else  // error-reduction step (50 iterations)

$g(x) = g_2(x) - \gamma\Delta(x)$, for $x \in \Omega$;

end

// keep intermediate kernels obeying spatial constraints;

$k'_m = g_2 - \Delta$;

end $k_n(x) = \text{median}\{k'_m(x) : N_{inner} - 100 \le m \le N_{inner}\}$;

end

Output: $k_n$ with highest likelihood of [16] when decoavolving a small window;

---

Figure 4:
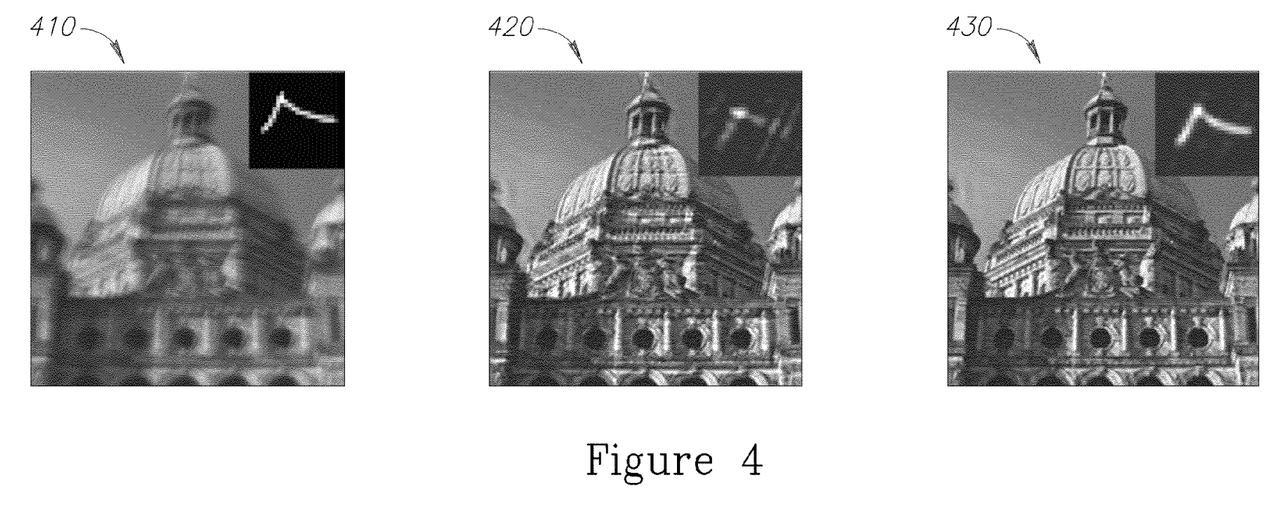
FIG. 4 shows photos illustrating an aspect according to some embodiments of the present invention.

FIG. 4 shows photos illustrating an aspect according to embodiments of the present invention. Image 410 illustrates a blurred image. Image 420 is an image treated with error reduction whereas image 430 was treated with the phase retrieval algorithm of the aforementioned Algorithm 2. It is understood that other phase retrieval algorithms may be used herein.

Rather than taking the kernel of the last iteration, it is suggested by embodiments of the present invention to take the pixel-wise median of the kernels computed, for example, in the last 250 iterations. The kernels recovered from their PS are defined up to a translation and mirroring in space. Thus, before we compute the median we normalize their offset and flip them (if needed) based on their first moments.

Figure 5:
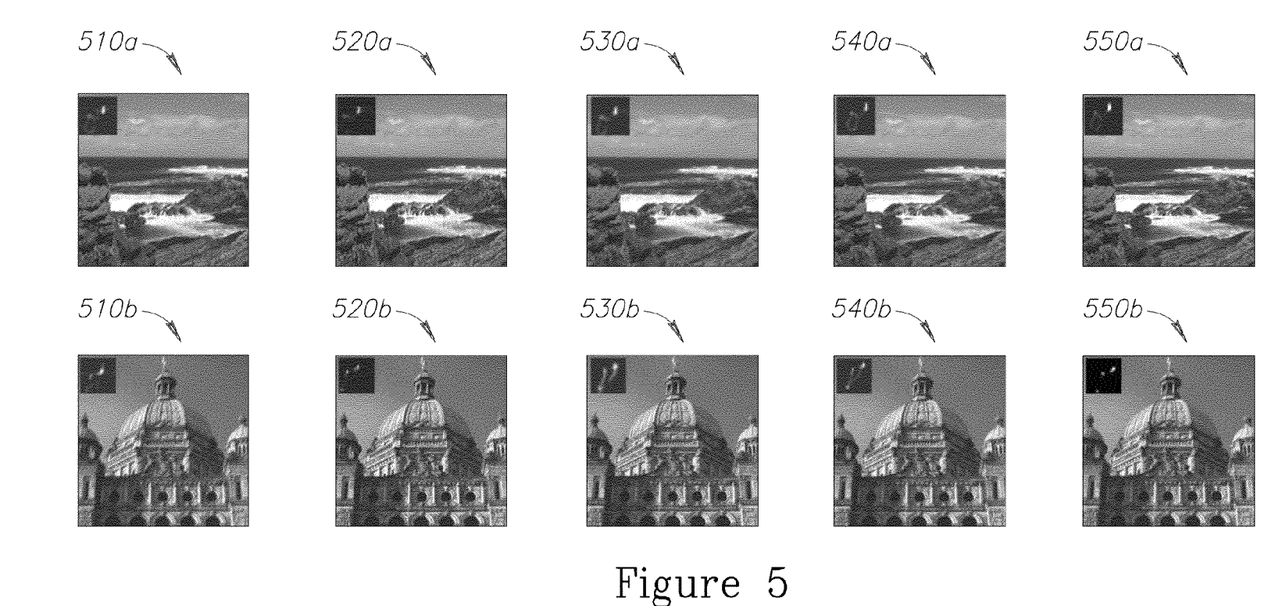
FIG. 5 shows photos illustrating another aspect according to some embodiments of the present invention.
Figure 6:
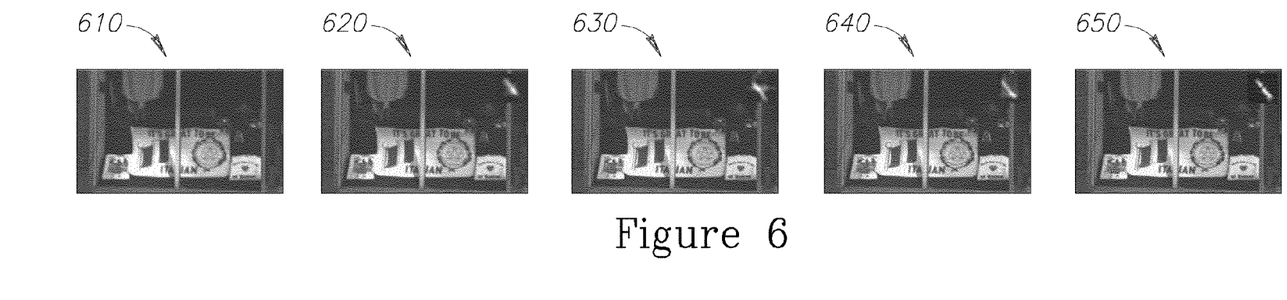
FIG. 6 shows photos illustrating yet another aspect according to some embodiments of the present invention.

FIGS. 4, 5, and 6 show photos illustrating an aspect according to some embodiments of the present invention. While images 410, 420, 430, 510A, 520A, 530A, 510B, 520B, 530B, illustrate blurred images that were treated by prior art methods, images 440, 540A, 540B, and 640 illustrate the original image and 450, 550A, 550B, and 650 illustrate blurred images treated by the embodiments of the present invention. The improved accuracy is apparent for 450, 550A, 550B, and 650 when compared with prior art images bot with man-made landscape and natural environment alike.

Advantageously, the method in accordance with embodiments of the present invention enable recovering the blur kernel in motion-blurred natural images based on the statistical deviations they exhibit in their spectrum. The proposed method extracts a set of statistics from the input image, after properly whitening its spectrum, and uses them to recover the blur. Thus, it achieves favorable running-times compared to other methods that perform MAP estimation and recover the latent image repeatedly in the course of estimating the kernel.

As will be appreciated by one skilled in the art, aspects of the present invention may be embodied as a system, method or an apparatus. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The inveniton claimed is:

1. A method comprising:
obtaining a blurred image B, being a product of a blur kernel k applied to an original image I, wherein B and I are matrices representing pixel image arrays and k is a kernel of a matrix;
calculating $f_\theta(x)=R_{d*P\theta(B)}(x)$ for every angle $\theta$, wherein R denotes an autocorrelation operator, $P_\theta$ denotes a projection operator of a two dimensional signal into one dimension based on angle $\theta$, and d denotes a one dimensional differentiation filter applied to a product of the projection operator $P_\theta$ and the blurred image B;
setting support parameters $s_\theta$ to $\mathrm{argmin}_x f_\theta(x)$;
estimating $|\hat{k}|^2$ denoting a spectral power of the blur kernel based on a given support parameter;
estimating the blur kernel k using a phase retrieval algorithm, based on the estimated spectral power of the blur kernel $|\hat{k}|^2$;
updating the support parameters $s_\theta$ to $\mathrm{argmax}_x (R_{P\theta(k)}(x) > a \cdot \max(R_{P\theta(k)}))$, wherein a is constant number; and
repeating the estimating of the spectral power $|\hat{k}|^2$, the estimating of the kernel and the updating of the support parameters $s_\theta$ in an expectation maximization (EM) procedure, to yield the blur kernel k.

2. The method according to claim 1, wherein the projection operator $P_\theta$ is achieved by integrating the two dimensional signal along a direction orthogonal to the angle $\theta$.

3. The method according to claim 1, wherein blur kernel k represents the blur operation which transforms I to B due to movements of a capturing device upon capturing the blurred image.

4. The method according to claim 1, wherein I is a natural image captured by an image capturing device.

5. The method according to claim 1, wherein the angles $\theta$ are selected so that each selected angle corresponds with a pixel of the pixel array.

6. The method according to claim 1, further comprising using the retrieved blur kernel k to retrieve the original image.

7. The method according to claim 1, wherein a is between 0 and 1.

8. A system comprising:

A computer memory configured to obtain a blurred image B, being a product of a blur kernel k applied to an original image I, wherein B and I are matrices representing pixel image arrays and k is a kernel of a matrix; and a computer processor configured to:

(a) calculate $f_\theta(x)=R_{d*P\theta(B)}(x)$ for every angle $\theta$, wherein R denotes an autocorrelation operator, $P_\theta$ denotes a projection operator of a two dimensional signal into one dimension based on angle $\theta$, and d denotes a one dimensional differentiation filter applied to a product of the projection operator $P_\theta$ and the blurred image B;

(b) set support parameters $s_\theta$ to $\mathrm{argmin}_x f_\theta(x)$;

(c) estimate $|\hat{k}|^2$ denoting a spectral power of the blur kernel based on a given support parameter;

(d) estimate the blur kernel k using a phase retrieval algorithm, based on the estimated spectral power of the blur kernel $|\hat{k}|^2$;

(e) updating the support parameters $s_\theta$ to $\mathrm{argmax}_x (R_{P\theta(k)}(x) > a \cdot \max(R_{P\theta(k)}))$, wherein a is constant number; and (f) repeat the estimating of the spectral power $|\hat{k}|^2$, the estimating of the kernel and the updating of the support parameters $s_\theta$ in an expectation maximization (EM) procedure, to yield the blur kernel k.

9. The system according to claim 8, wherein the projection operator $P_\theta$ is achieved by integrating the two dimensional signal along a direction orthogonal to the angle $\theta$.

10. The system according to claim 8, wherein blur kernel k represents the blur operation which transforms I to B due to movements of a capturing device upon capturing the blurred image.

11. The system according to claim 8, wherein I is a natural image captured by an image capturing device.

12. The system according to claim 8, wherein the angles $\theta$ are selected so that each selected angle corresponds with a pixel of the pixel array.

13. The system according to claim 8, further comprising using the retrieved blur kernel k to retrieve the original image.

14. The system according to claim 8, wherein a is between 0 and 1.

15. A computer program product comprising:

a non-transitory computer readable storage medium having computer readable program embodied therewith, the computer readable program comprising:

computer readable program configured to obtain a blurred image B, being a product of a blur kernel k applied to an original image I, wherein B and I are matrices representing pixel image arrays and k is a kernel of a matrix;

computer readable program configured to calculate $f_\theta(x)=R_{d*P\theta(B)}(x)$ for every angle $\theta$, wherein R denotes an autocorrelation operator, $P_\theta$ denotes a projection operator of a two dimensional signal into one dimension based on angle $\theta$, and d denotes a one dimensional differentiation filter applied to a product of the projection operator $P_\theta$ and the blurred image B;

computer readable program configured to set support parameters $s_\theta$ to $\mathrm{argmin}_x f_\theta(x)$;

computer readable program configured to estimate $|\hat{k}|^2$ denoting a spectral power of the blur kernel based on a given support parameter;

computer readable program configured to estimate the blur kernel k using a phase retrieval algorithm, based on the estimated spectral power of the blur kernel $|\hat{k}|^2$;

computer readable program configured to updating the support parameters $s_\theta$ to $\mathrm{argmax}_x (R_{P\theta(k)}(x) > a \cdot \max(R_{P\theta(k)}))$, wherein a is constant number; and computer readable program configured to repeat the estimating of the spectral power $|\hat{k}|^2$, the estimating of the kernel and the updating of the support parameters $s_\theta$ in an expectation maximization (EM) procedure, to yield the blur kernel k.

16. The computer program product according to claim 15, wherein the projection operator $P_\theta$ is achieved by integrating the two dimensional signal along a direction orthogonal to the angle $\theta$.

17. The computer program product according to claim 15, wherein blur kernel k represents the blur operation which transforms I to B due to movements of a capturing device upon capturing the blurred image.

18. The computer program product according to claim 15, wherein I is a natural image captured by an image capturing device.

19. The computer program product according to claim 15, wherein the angles $\theta$ are selected so that each selected angle corresponds with a pixel of the pixel array.

20. The computer program product according to claim 15, further comprising computer readable program configured to use the retrieved blur kernel k to retrieve the original image.

* * * * *